United States Patent
VanDenberg

(10) Patent No.: US 6,585,223 B1
(45) Date of Patent: Jul. 1, 2003

(54) VARIABLE COMPLIANCE BUSHING

(75) Inventor: Ervin K. VanDenberg, Massillon, OH (US)

(73) Assignee: Meritor Heavy Vehicle Suspensions, Inc., Troy, MI (US)

( * ) Notice: Subject to any disclaimer, the term of this patent is extended or adjusted under 35 U.S.C. 154(b) by 0 days.

(21) Appl. No.: 09/395,577

(22) Filed: Sep. 14, 1999

(51) Int. Cl.$^7$ .............................................. F16M 13/00
(52) U.S. Cl. ........................ 248/635; 248/584; 267/276
(58) Field of Search ................................ 248/559, 564, 248/566, 570, 581, 584, 608, 635, 666, 647; 267/270, 276, 141, 280, 281, 293

(56) References Cited

U.S. PATENT DOCUMENTS

| | | | |
|---|---|---|---|
| 3,685,772 A | | 8/1972 | Giaccone |
| 3,891,191 A | * | 6/1975 | Choules et al. .............. 259/1 X |
| 4,166,640 A | | 9/1979 | Van Denberg |
| 4,195,887 A | * | 4/1980 | Ruddell ........................ 305/42 |
| 4,213,718 A | * | 7/1980 | Lumby ........................ 403/197 |
| 4,728,086 A | | 3/1988 | Ishiyama et al. |
| 4,809,960 A | * | 3/1989 | Kakimoto et al. .......... 267/141 |
| 4,821,828 A | * | 4/1989 | Schwerzler et al. ....... 180/68.4 |
| 4,872,650 A | | 10/1989 | Tabata et al. |
| 5,037,126 A | | 8/1991 | Gottschalk et al. |
| 5,058,867 A | * | 10/1991 | Hadano et al. ........... 267/141.3 |
| 5,275,429 A | * | 1/1994 | Bunker ........................ 280/688 |
| 5,439,203 A | * | 8/1995 | Hadano ................. 267/140.12 |
| 5,544,871 A | * | 8/1996 | Reinemuth et al. ......... 267/293 |
| 5,988,672 A | * | 11/1999 | Van Denberg .............. 280/683 |
| 6,003,897 A | * | 12/1999 | Dostert et al. .............. 280/781 |

* cited by examiner

Primary Examiner—Leslie A. Braun
Assistant Examiner—A. Joseph Wujciak
(74) Attorney, Agent, or Firm—Carlson, Gaskey & Olds

(57) ABSTRACT

A bushing for use in a vehicle suspension system includes a pair of elastomeric bearings having cylindrical holes formed therein and flanges formed integrally therewith. The bushing further includes a journal carried by the bearings in the cylindrical holes. In the first embodiment, the bearings are of substantially elliptical cross section and provide a compliance in a major axis direction that is different than the compliance in a minor axis direction. In a second embodiment, the bearings additionally are formed with channels of partial substantially cylindrical section on the outer surfaces, thereby giving the bearings a compliance in the major axis direction of a nonlinear higher order than the corresponding compliance of the first embodiment. A third embodiment is similar to the second embodiment except that the bearings are formed with voids of a partial substantially conic section formed on the outer surface, with the apex of the voids being adjacent the flanges. The third embodiment operates similarly to the second embodiment, except that the compliance of the bearings in response to vertical loading is of a higher order than the corresponding compliance of the second embodiment. A fourth embodiment is similar to the first embodiment with the exception that the bearings are formed with a pair of compliance holes of substantially cylindrical section parallel and spaced apart from the cylindrical hole in the direction of the major axis and diametrically opposed about the cylindrical hole. The fourth embodiment operates similarly to the first and second embodiments, with the exception that the corresponding compliance in the major axis direction is of a higher order and can be varied by modifying the size, shape, and location of the compliance holes.

18 Claims, 5 Drawing Sheets

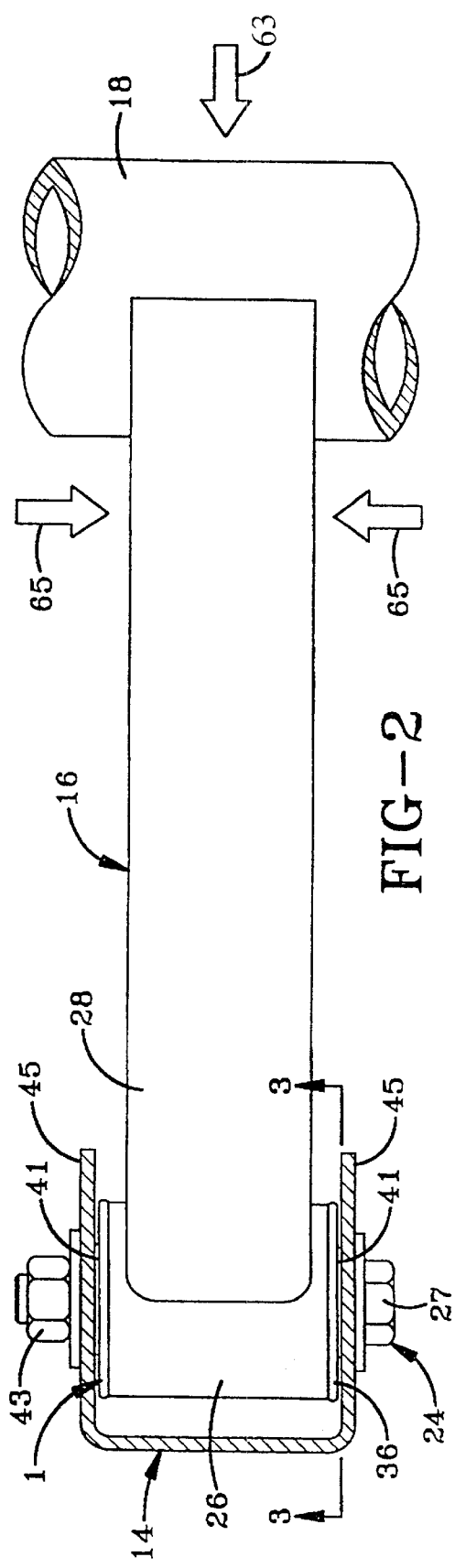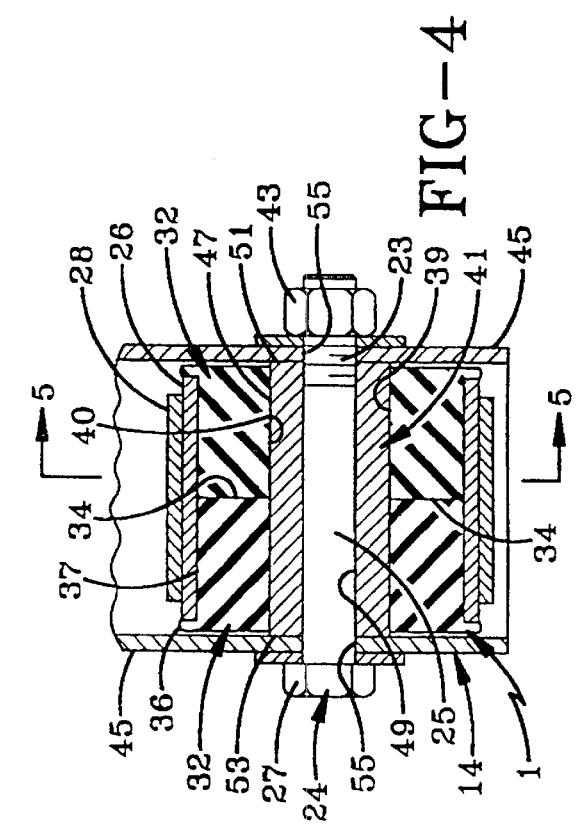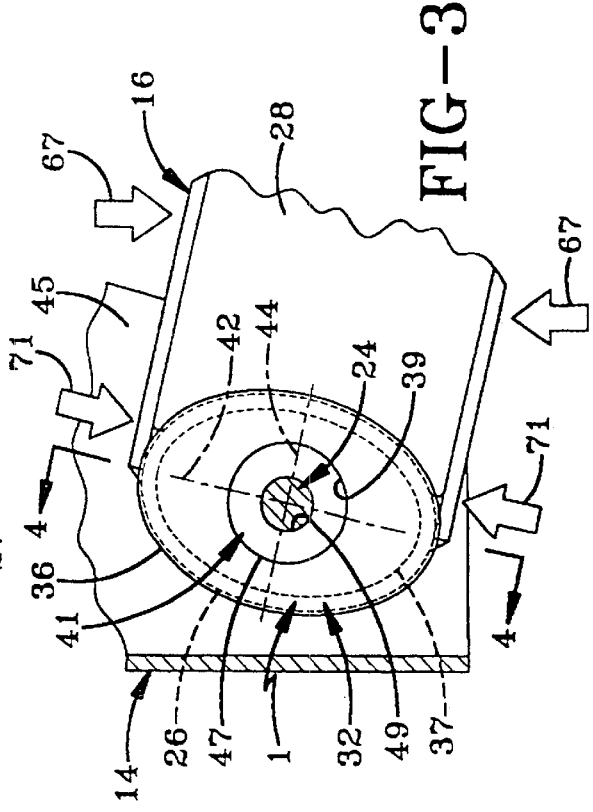

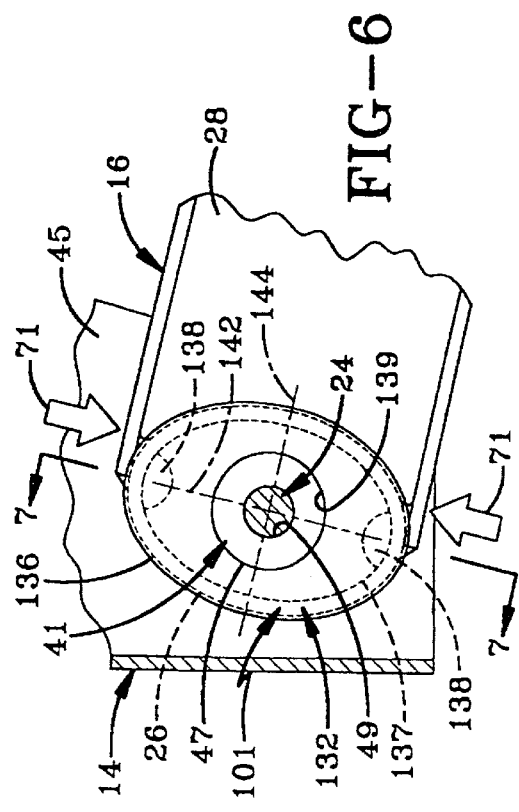
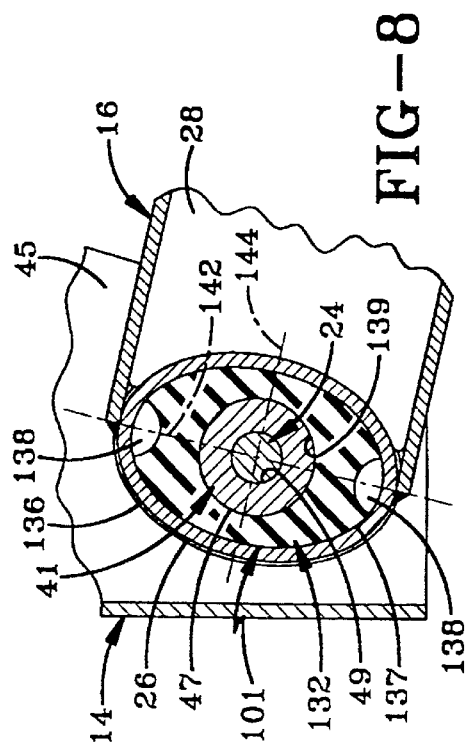
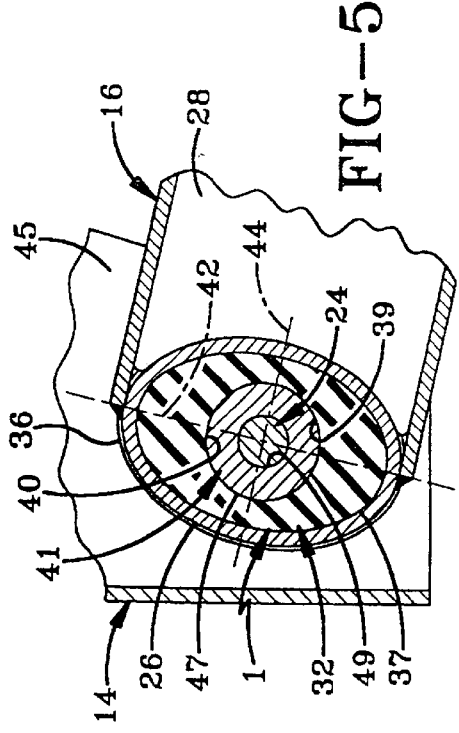
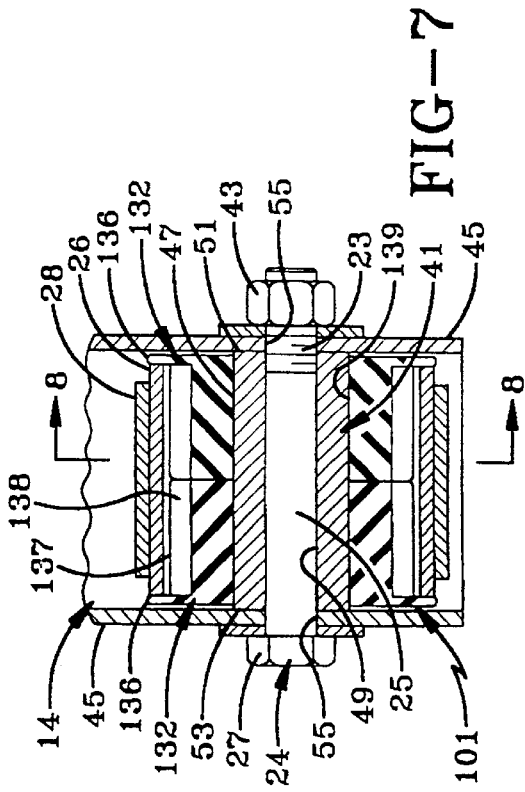

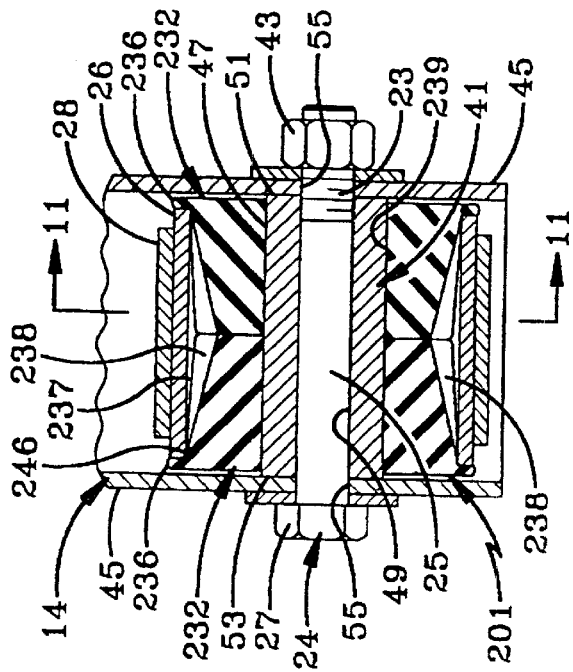
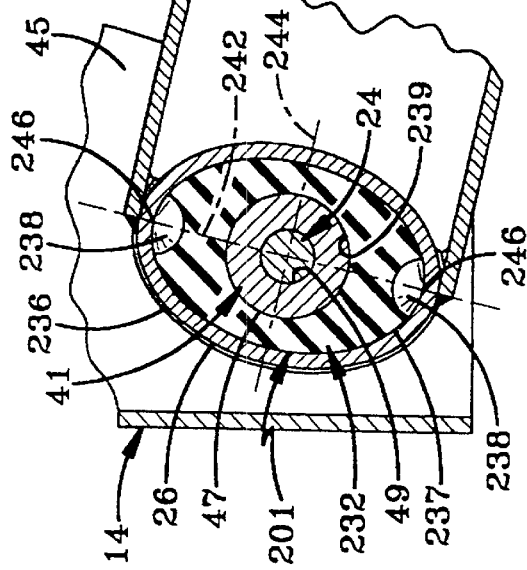
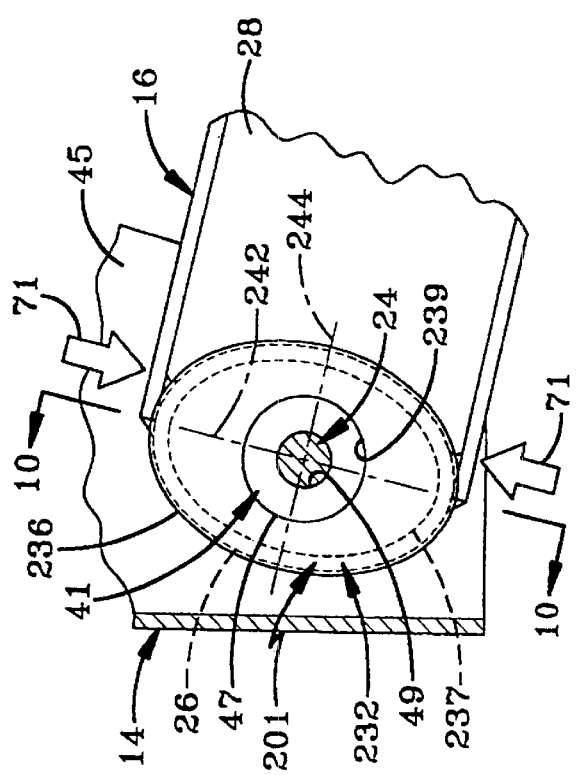

VARIABLE COMPLIANCE BUSHING

BACKGROUND OF THE INVENTION

1. Technical Field

The invention relates generally to an improved bushing for a vehicle suspension system. More particularly, the invention relates to an improved bushing that provides different compliances in response to different loading conditions with the bushing being relatively simple to install. Specifically, the invention relates to a split bushing that provides a compliance in the horizontal direction that is different than the compliance in the vertical direction and that provides rotational and longitudinal support for a suspension beam and that allows for expedited installation with conventional hand tools.

2. Background Information

The trucking industry has witnessed a dramatic increase in the cost associated with the transportation of goods. High costs and increased competition mandate that over-the-road vehicles be utilized as efficiently as possible to minimize expense and maximize productivity. Thus, the industry is constantly in search of improvements that can then increase efficiency of trucks and/or reduce the cost of purchasing and operating trucks.

The bushings of truck suspension systems provide a coupling between the vehicle frame and the vehicle suspension beam to which the vehicle axle and wheels are connected. A typical trailing arm suspension system utilizes a suspension beam having a bushing seat at one end for holding a bushing therein. The bushing typically contains a bearing formed with a cylindrical hole, with the cylindrical hole carrying a hollow journal which holds a pin. The pin is attached to a hanger bracket on the vehicle frame and provides a rotational connection between the beam/bushing assembly and the vehicle frame. The suspension beam is connected at the opposite end to the vehicle axle which, in turn, supports the vehicle wheels.

Suspension system bushings are subjected to a wide variety of loads. Longitudinal loads result from acceleration and braking and are transmitted along the length of the beam to the bushing. Vertical loads result from a wheel on one side of the truck traversing an obstruction that the corresponding wheel on the other side of the truck does not traverse, such as when one side of the truck traverses a curb. Such differential loading of an axle causing a torque acting about a central axis of the beam to be transmitted along the length of the beam and onto the bushing. Rotational forces result from compression of the suspension system due to vehicle loading and unloading and due to the vehicle traversing obstructions in the road surface and are transmitted from the wheels to the bushing by rotation of the beam about the pin. Lateral loads result from turning of the vehicle and are transmitted along the beam and against the hanger bracket in a direction parallel with the pin. Such loading phenomena differ significantly from each other both as to magnitude and duration.

Bushings are often manufactured of materials having elastomeric properties whereby the bushings act in conjunction with springs and shock absorbers to provide an additional level of isolation between the vehicle frame and the vehicle wheels. Since the magnitudes and durations of the aforementioned loading forces and torques differ considerably, it is often desirable to design a bushing to provide multiple compliances whereby the bushing reacts differently to the various loading phenomena. For instance, a bushing may possess a first compliance to respond to a given set of forces as well as a lower compliance along a different axis to respond to higher forces occurring along that axis. Moreover, it is often desirable to provide a lateral bushing member between the bushing seat of the suspension beam and the hanger bracket to alleviate bearing stresses therebetween caused by lateral loading.

Such loading is typical of trailing arm suspension and is well understood in the relevant art. Moreover, bushings having different compliances responsive thereto are similarly known and understood in the relevant art. Various bushings, combined with washer-type lateral bushings, all of which are known in the art, have been employed in various combinations to counteract the effect of such forces with various degrees of success. Such bushing have often been difficult to install and have required specialized tools such as high-tonnage presses. Moreover, assembly of suspension beams in conjunction with washer-type lateral bushing members is tedious and difficult due to the multiplicity of components. Moreover, bushings responsive to the aforementioned loading phenomena have typically been costly, difficult to install, and of a limited useful life. Thus, the need exists for a bushing providing varying responses to the multiple loading phenomena experienced by a vehicle suspension, that is inexpensive, easy to install, and has an economical service life.

SUMMARY OF THE INVENTION

In view of the foregoing, an objective of the invention includes providing a bushing that provides a compliance in response to longitudinal loading of a suspension system caused by acceleration and braking of a vehicle.

Another objective of the invention is to provide a bushing that provides a compliance in response to vertical loading of a suspension system caused by the wheels of an axle traversing dissimilar obstructions in the roadway.

Another objective of the invention is to provide a bushing that provides a compliance in response to rotational loading resulting from compression of a vehicle suspension system.

Another objective of the invention is to provide a bushing that provides a compliance in response to lateral loading between a suspension beam and a hanger bracket acting in a direction parallel to the length of an axle pin and resulting from turning of the vehicle.

Another objective of the invention is to provide a bushing that provides multiple compliances for response to multiple loading configurations.

Another objective of the invention is to provide a bushing that provides a compliance for responding to vertical loading that is different than the compliance provided for responding to longitudinal loading.

Another objective of the invention is to provide a bushing that can be installed with conventional hand tools.

Another objective of the invention is to provide a bushing that is split into two halves.

Another objective of the invention is to provide a bushing having flanges formed integrally therewith at the outer ends thereof for reaction to lateral loading resulting from turning of the vehicle.

Another objective of the invention is to provide a bushing that reacts to vertical, longitudinal, rotational, and lateral loading modes.

Another objective of the invention is to provide a split bushing that responds to various combinations of vertical, longitudinal, rotational, and lateral loading.

Another objective of the invention is to provide a bushing that is inexpensive to manufacture.

These and other objectives and advantages of the invention are obtained from the improved bushing, the general nature of which can be stated as including a pair of bearings, each of the bearings having a hole therein, each of the bearings having an outer surface, an outer end, and an inner end, and each of the bearings having a radial compliance that varies about its circumference.

BRIEF DESCRIPTION OF THE DRAWINGS

The preferred embodiments of the invention, illustrative of the best modes in which Applicant has contemplated applying the principals of the invention, are set forth in the following description and are shown in the drawings.

FIG. 2 is a plan view of a typical beam and hanger bracket assembly with arrows representing longitudinal and lateral forces;

FIG. 3 is a side view of the bushing of the present invention with arrows representing rotational forces on the beam and vertical forces on the bushing;

FIG. 4 is sectional view of the bushing of the present invention taken along line 4—4 of FIG. 3;

FIG. 5 is a sectional view of the bushing of the present invention taken along line 5—5 of FIG. 4;

FIG. 6 is a side view of a second embodiment of the bushing of the present invention;

FIG. 7 is a sectional view of the second embodiment taken along line 7—7 of FIG. 6;

FIG. 8 is a sectional view of the second embodiment taken along line 8—8 of FIG. 7;

FIG. 9 is a side view of a third embodiment of the bushing of the present invention;

FIG. 10 is a sectional view of the third embodiment taken along line 10—10 of FIG. 9;

FIG. 11 is a sectional view of the third embodiment taken along line 11—11 of FIG. 10;

Similar numbers refer to similar parts throughout the specification.

DESCRIPTION OF THE PREFERRED EMBODIMENTS

Figure 1:
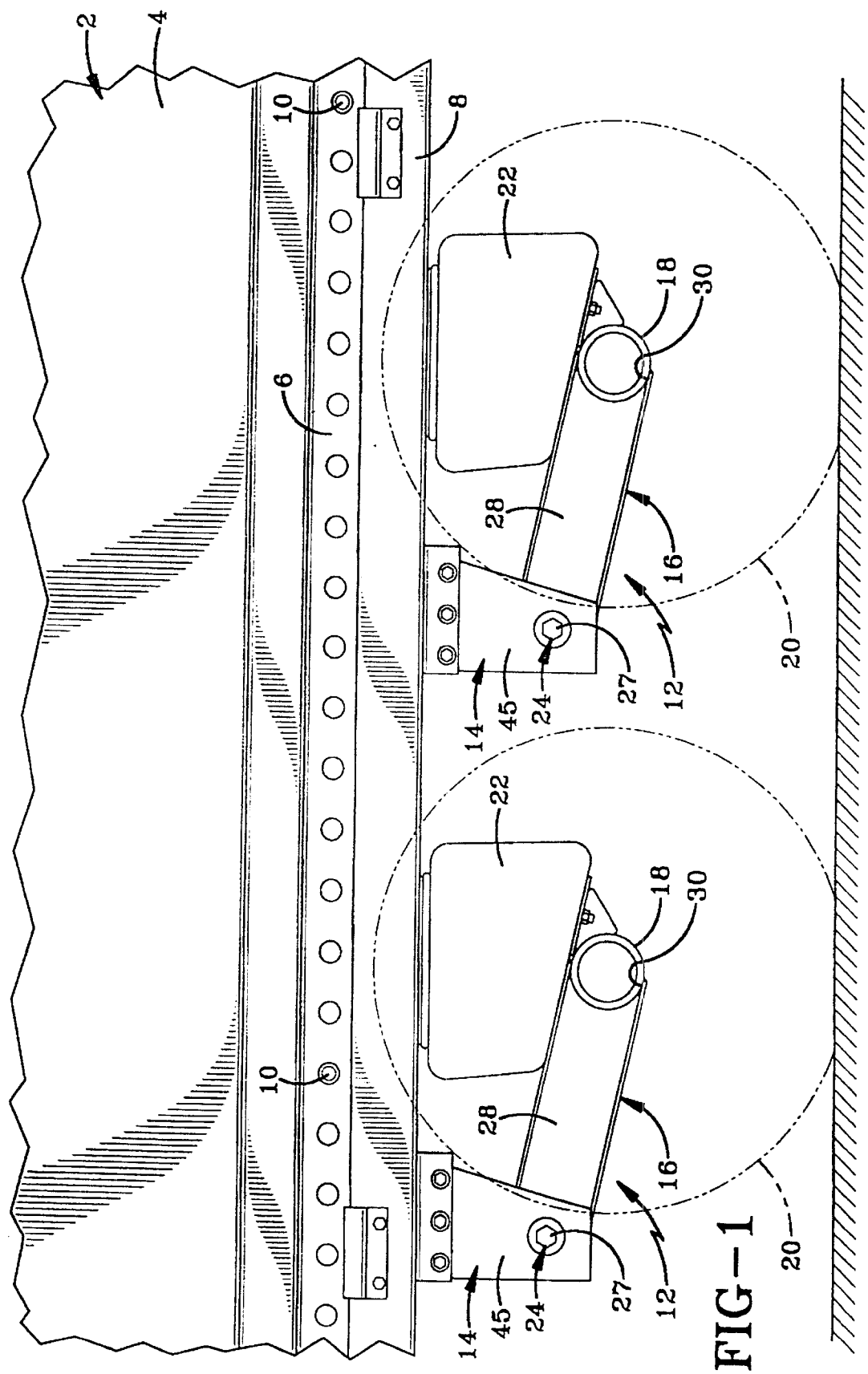
FIG. 1 is a side view of a typical trailing arm suspension system.

The improved bushing of the present invention is indicated generally by the numeral 1, and is particularly shown in FIGS. 2–5. Bushing 1 is a component of a suspension system 12 which is attached to a vehicle 2. FIG. 1 shows only one side of suspension system 12, the other side being substantially identical.

Vehicle 2 includes a cargo box 4 supported by a pair of frame rails 6 extending longitudinally along the length of cargo box 4. Suspension system 12 includes hanger brackets 14 connected to a pair of parallel and spaced apart slide channels 8. Slide channels 8 are spaced apart a distance equal to the distance between frame rails 6 and are mounted to frame rails 6 with a plurality of locking pins 10. A pin 24 pivotally attaches a beam 16 to the lower end of each hanger bracket 14. Pin 24 includes a head 27, a shank 25, and a plurality of external threads 23 formed thereon which cooperate threadably with a nut 43. An air spring 22 connects to beam 16 at an end opposite its connection to hanger bracket 14 and extends between beam 16 and frame 8.

Beam 16 includes a link 28 having at a first end a bushing seat 26 and having at an opposite end an axle seat 30. Bushing seat 26 is formed with a void of substantially elliptical section having a major axis as shown at the numeral 42 perpendicular to both the length of beam 16 and the length of pin 24 and having a minor axis as shown at the numeral 44 parallel with the length of beam 16 but perpendicular to the length of pin 24.

Hanger bracket 14 contains a pair of parallel spaced apart ears 45, which are substantially planar members, each ear 45 being formed with a circular bore 55 formed therein. Bores 55 are each of sufficient size to accommodate pin 54 with minimal clearance.

Bushing 1 includes a journal 41 and a pair of elastomeric bearings 32, with each bearing 32 being formed with a substantially cylindrical hole 39 therein forming an inner surface 40. Journal 41 is carried in holes 39 with preferably at least a nominal interference fit therebetween. Bearings 32 have an arcuate outer surface 37 terminating in a flat annular inner end 34 perpendicular thereto. In accordance with one of the features of the invention, bearings 32 terminate in a flange 36 at the end opposite inner end 34. Flange 36 is an annular protuberance extending outwardly from outer surface 37 and preferably formed integrally therewith. While in the preferred embodiments bearings 32 contain flanges 36, other embodiments not shown of the present invention may be constructed without flanges 36.

The distance between inner surface 40 and outer surface 37 defines a wall thickness. Bearings 32 are elongated bodies having substantially elliptical sections measured perpendicular to a center axis of hole 39. Thus, the wall thickness of bearings 32 varies between a maximum along major axis 42 and a minimum along minor axis 44.

In accordance with the features of the present invention, bearings 32 are preferably manufactured of a tough material having elastomeric properties such as polyurethane. Bearings 32 are configured to fit into bushing seat 26 such that outer surface 37 is internal to bushing seat 26 and flanges 36 remain outside bushing seat 26 (see FIG. 4.) Thus, when bushing 1 is assembled into suspension system 12, flanges 36 lie between bushing seat 26 and ears 45 of hanger bracket 14. It should be understood that in the other embodiments of the present invention, bearings 32 may be of non-elliptical sections without departing from the spirit of the present invention so long as bearings 32 and bushing seats 26 are both configured to fit together as set forth above.

Journal 41 is a hollow substantially cylindrical body formed with a support hole 49 configured to accept shank 25 of pin 24 with minimal clearance. Support hole 49 defines an internal arcuate support surface 47 on journal 41 disposed between a first end 51 and a second end 53 of journal 41. First and second ends 51 and 53 are flat annular surfaces.

Bushing 1 is assembled into bushing seat 26 by inserting inner ends 34 of bearings 32 into bushing seat 26 until flanges 36 rest against bushing seat 26. Journal 41 is then inserted into holes 39. In accordance with the features of the present invention, the preferred nominal interference fit between journal 41 and holes 39 permits journal 41 to be installed in holes 39 by hand or with conventional hand tools, thus providing for expedited installation at a workshop, or at the roadside as needed.

Inner ends 34 lie closely adjacent each other when bearings 32 are properly inserted into bushing seat 26. While in the preferred embodiments inner ends 34 are in physical contact with each other inside bushing seat 26, inner ends 34 may be separated a distance from each other without departing from the spirit of the present invention. For reasons set out more fully below, first and second ends 51 and 53 of journal 41 protrude at least a nominal distance beyond flanges 36 when bearings 32 are fully installed into bushing seat 26 and journal 41 is properly installed in holes 39.

After bushing 1 is inserted into bushing seat 26 of beam 16, bushing seat 26 is positioned between ears 46 such that bores 55 line up with support hole 49. Pin 24 is then inserted through bores 55 and support hole 49, and nut 43 is threaded onto external threads 23. When nut 43 is threaded and tightened onto pin 24, ears 45 of hanger bracket 14 are thereby urged inwardly toward each other. Since first and second ends 51 and 53 of journal 41 protrude at least a nominal distance beyond flanges 36, the tightening of nut 43 onto pin 24 causes ears 45 to be compressed against first and second ends 51 and 53 but not against flanges 36 of bearings 32. As such, while journal 41 is held substantially stationary between ears 45, bearings 32 are free to rotate about and slide along journal 41 within the bounds of any interference fit therebetween.

The varying compliances of bushing 1 are achieved in part by configuring bearings 32 to have a varying wall thickness as set forth above. Bearings 32 are, in the preferred embodiments, manufactured of a homogenous material having a single modulus of elasticity, although materials having different properties may be used without departing from the spirit of the present invention. As set forth above, the wall thickness of bearings 32 varies between a maximum in the major axis direction 42 and a minimum in the minor axis direction 44. Bushing 1 will, therefore, have a compliance in the major axis direction 42 that is higher than the compliance in the minor axis direction 44.

Longitudinal forces 63 (see FIG. 2) act upon beams 16 in a direction parallel with the length of beam 16 and cause bushing seat 26 to compress bearings 32 in the minor axis direction 44. Longitudinal forces 63 are produced in both positive and negative magnitudes by acceleration and braking of the vehicle and by encounters by tire and wheel assembly 20 with obstructions and unevenness in the road surface, as well as through other mechanisms.

Vertical forces 71 result from movement by one tire and wheel assembly 20 in the vertical direction without a corresponding movement by the other tire and wheel assembly 20 sharing the same axle 18. Such movement occurs, for instance, when one tire and wheel assembly 20 traverses a bump that the corresponding tire and wheel assembly 20 on the opposite side of the vehicle does not. Such loading causes a torque to act about a lengthwise axis of beam 16 and result in vertical forces 71 on bearings 32 along the major axis direction 42.

Longitudinal forces 63 are of a nature and magnitude different than vertical forces 71. Thus, the varying compliances provided by bearings 32 help bushing 1 to isolate cargo box 4 from the various forces encountered by vehicle 2 better than would a bushing having a single constant compliance.

The varying compliances of bearings 32 further assist bushing 1 in maintaining stability and control of vehicle 2. While longitudinal forces 63 operate along the length of beam 16, and in turn along the length of vehicle 2, vertical forces operate vertically with respect to hanger bracket 14, thereby causing vehicle 2 to rotate about an axis parallel with the vehicle length. Vertical forces 71 can potentially cause vehicle 2 to tip over if vertical forces 71 of sufficient magnitude are transmitted through hanger bracket 14 to vehicle 2 without compliance of bushing 1. Thus, the compliance of bushing 1 must be configured to isolate vehicle 2 from longitudinal forces 63 while at the same time preventing tip-over due to vertical forces 71.

Rotational forces 67 result from the up and down movement of tire and wheel assemblies 20 due to the loading and unloading of cargo into cargo box 4 and due to the travel of tire and wheel assemblies 20 up and over road-borne obstructions and unevenness. Since journal 41 is tightly clamped between ears 45 of hanger bracket 14, journal 41 remains stationary with respect to hanger bracket 14 despite rotational movements of beam 16 about pin 24. As journal 41 is preferably fitted into holes 39 of bearings 32 with at least a nominal interference fit, rotational movement of beam 16 about pin 24 results in sliding friction between journal 41 and bearings 31 as well as rotational elastic deformation of bearings 32.

Lateral forces 65 result from turns by vehicle 2. During turns, cargo box 4 is necessarily moving in a direction different than tire and wheel assembly 20. During turns, therefore, lateral forces 65 are transmitted from tire and wheel assemblies 20 to beams 16, causing bushing seats 26 to bear upon flanges 36. In turn, flanges 36 bear upon ears 45 of hanger brackets 14 which are connected to cargo box 4. Thus, lateral forces 65 result essentially in compressive forces on flanges 36.

Lateral forces 65 cause cargo box 4 to change direction in conjunction with tire and wheel assemblies 20. In accordance with the objectives of the invention, flanges 36 help to alleviate the wear caused by metal-to-metal bearing stress and friction between bushing seats 26 and ears 45, and further help to isolate cargo box 4 from the vibration and deflection inherently caused by lateral forces 65.

A second embodiment of the bushing of the present invention is indicated generally at 101 in FIGS. 6–8. Bushing 101 is similar to bushing 1 and thus similar numerals are used to point out the similar elements. Bushing 101 includes a pair of bearings 132 that each have an outer surface 137 defining a pair of channels 138. Channels 138 are concave surfaces of a substantially partial cylindrical section parallel to and spaced apart from hole 139. Channels 138 lie along a major axis 142 and are diametrically opposed. The size and dimensions of the cross section of channels 138 is essentially continuous and unvarying along the length of bearings 132. It should be understood, however, that channels 138 do not extend through flanges 136.

By forming bearings 132 with channels 138, the compliance of bushing 101 in the major axis direction 142 possesses an additional level of nonlinearity. As such, bearings 132 provide a relatively high initial compliance in the major axis direction 142, which compliance decreases in response to forces of a greater magnitude. Thus, vertical forces 71 that are of a relatively smaller magnitude are easily isolated from vehicle 2 by the high initial compliance of bearings 132 in the major axis direction 142. Vertical forces 71 of a relatively larger magnitude are likewise isolated from vehicle 2 due to the residual lower compliance of bearings 132 in the major axis direction 142 that exists after the initial high compliance has been taken up. Major axis 142 is perpendicular to a minor axis 144.

A third embodiment of the bushing of the present invention is indicated generally at 201 and is depicted in FIGS.

9–11. Bushing 201 includes some elements similar with bushing 1 and thus similar numerals are used to point out the similar elements. Bushing 201 includes bearings 232 that each have an outer surface 237 defining a pair of voids 238. Voids 238 are concave surfaces of a partial conic section having a vertex 246 adjacent flange 236. In other embodiments, voids 238 may also be of a non-conic section without departing from the spirit of the present invention. Voids 238 are disposed along a major axis 242 and are diametrically opposed about hole 239. Major axis 242 is perpendicular to a minor axis 244.

With bearings 232 of bushing 201 configured with voids 238, the compliance of bearings 232 is similar to that of bearings 132 of bushing 101, except that the initial compliance of bearings 232 to vertical forces 71 of a relatively small magnitude is different than and of a higher order than the initial compliance of bearings 132 to similar loads.

Figure 13:
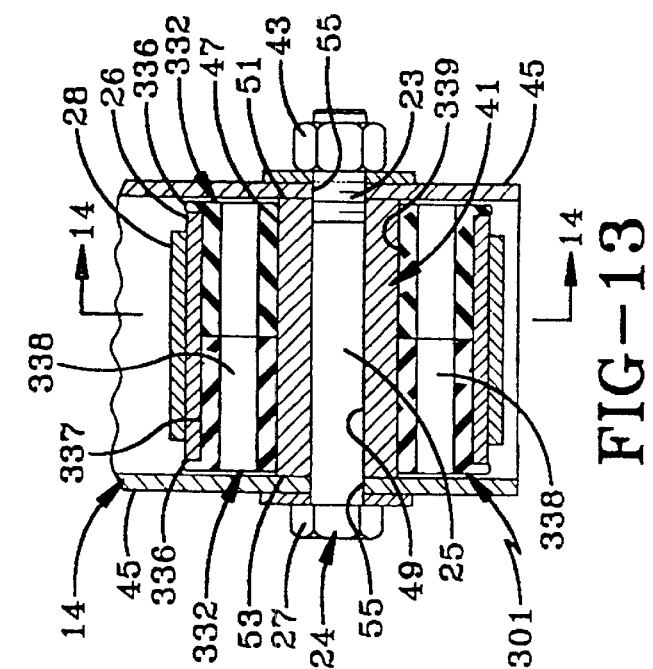
FIG. 13 is a sectional view of the fourth embodiment taken along line 13—13 of FIG. 12.
Figure 14:
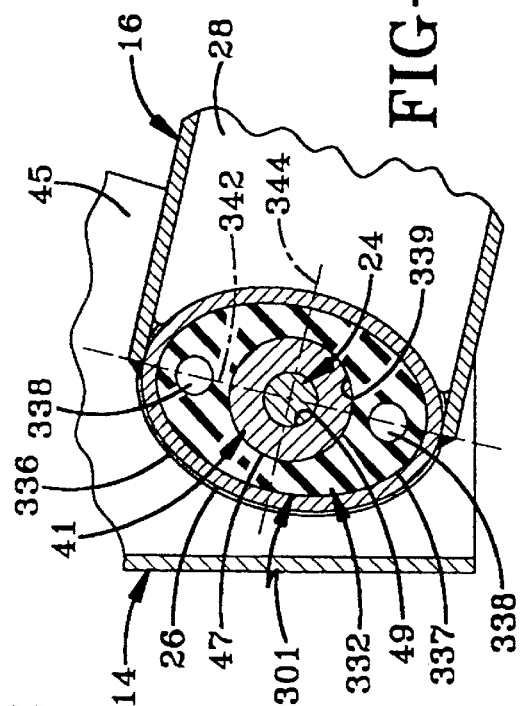
FIG. 14 is a sectional view of the fourth embodiment taken along line 14—14 of FIG. 13.
Figure 12:
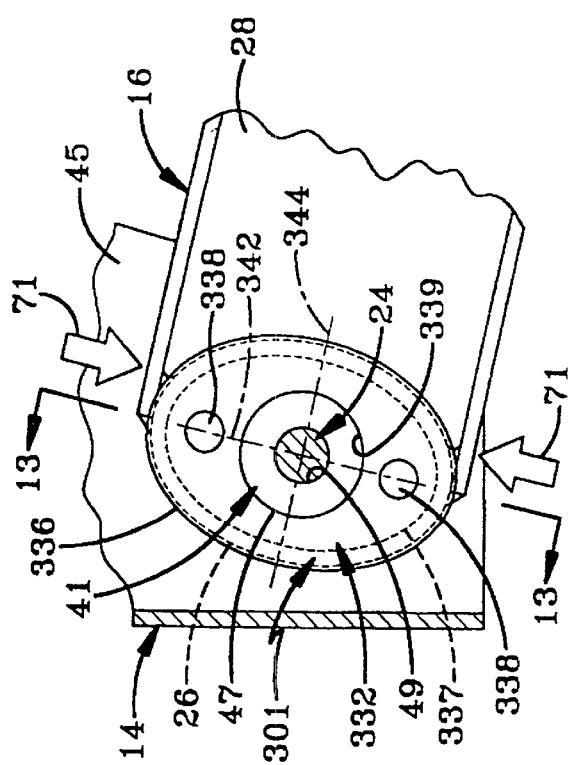
FIG. 12 is a side view of a fourth embodiment of the bushing of the present invention.

A fourth embodiment of the bushing present invention is indicated generally at 301 and is depicted in FIGS. 12–14. Bushing 301 is similar to bushing 1 and includes many of the same elements as bushing 1 and thus similar numerals are used to point out the similar elements. Bushing 301 includes a pair of bearings 332 that each have a pair of compliance holes 338 of substantially cylindrical section. Compliance holes 338 are parallel and spaced apart from hole 339 along a major axis 342 and are diametrically opposed about hole 339. Major axis 342 is perpendicular to a minor axis 344. Compliance holes preferably extend through flanges 336.

By configuring bearings 332 to contain compliance holes 338, the function of bushing 301 is similar to that of bushing 101 except that the compliance of bearings 332 along major axis 342 in response to vertical forces 71 of a relatively small magnitude can be greater or lesser depending upon the size, shape, and location of compliance holes 338. Thus, compliance holes 338 can be of non-cylindrical shapes and can be placed in differing locations without departing from the spirit of the present invention.

Accordingly, the improved variable compliance bushing is simplified, provides an effective, safe, inexpensive, and efficient device that achieves all the enumerated objectives of the invention, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the bushing is constructed and used, the characteristics of the construction, and the advantageous new and useful results obtained; the new and useful structures, devices, elements, arrangements, parts, and combinations are set forth in the appended claims.

Having thus described the invention, it is claimed:

1. A bushing insertable into a suspension system, said bushing comprising:
    a pair of bearings, each of said bearings having a hole therein;
    each of said bearings having an outer surface including a circumference, an outer end, and an inner end, each said holes defining an inner surface and wherein the distance between said inner surface and said outer surface defines a wall thickness varying about said circumference; and
    each of said bearings having a radial compliance that varies about said circumference.

2. The bushing as set forth in claim 1 in which said bearings are substantially identical to each other.

3. The bushing as set forth in claim 1 in which the radius of each of said outer surfaces varies about said circumference.

4. The bushing as set forth in claim 3 in which each of said bearings further includes a flange formed on said bearing adjacent said outer end.

5. The bushing as set forth in claim 4 in which said outer surface is substantially elliptical in shape, having a major axis and a minor axis, and in which the compliance along the major axis differs from the compliance along the minor axis.

6. The bushing as set forth in claim 5 further including a journal carried by said bearings within said holes.

7. The bushing as set forth in claim 1 in which each of said outer surfaces is at least partially concave.

8. The bushing as set forth in claim 7 further including a flange formed on said outer surface adjacent each of said outer ends.

9. The bushing as set forth in claim 7 in which each of said outer surfaces includes at least a first channel formed thereon in an axial direction.

10. The bushing as set forth in claim 9 in which said at least first channel has a partial substantially cylindrical section.

11. The bushing as set forth in claim 10 further including a flange formed on said outer surface adjacent each of said outer ends.

12. The bushing as set forth in claim 1 in which the radius of said outer surface varies along the length of said bearings.

13. The bushing as set forth in claim 12 further including a flange formed on said outer surface adjacent each of said outer ends.

14. The bushing as set forth in claim 1 in which said wall thickness varies along the length of said bearing.

15. A bushing insertable into a suspension system, said bushing comprising:
    a pair of bearings, each of said bearings having a hole therein;
    each of said bearings having an outer surface including a circumference, an outer end, and an inner end, each of said outer surfaces is at least partially concave defined by at least a first channel formed thereon in an axial direction, said at least first channel has a partial substantially conic section; and
    each of said bearings having a radial compliance that varies about said circumference.

16. The bushing as set forth in claim 15 further including a flange formed on said outer surface adjacent each of said outer ends.

17. A bushing insertable into a suspension system, said bushing comprising:
    a pair of bearings, each of said bearings having a hole therein;
    each of said bearings having an outer surface including a circumference, an outer end, and an inner end, each of said bearings has at least a first compliance hole formed therein in addition to said holes in said pair of bearings; and
    each of said bearings having a radial compliance that varies about said circumference.

18. The bushing as set forth in claim 17 further including a flange formed on said outer surface adjacent each of said outer ends.

* * * * *